United States Patent
Manna et al.

(10) Patent No.: US 10,339,026 B2
(45) Date of Patent: Jul. 2, 2019

(54) TECHNOLOGIES FOR PREDICTIVE MONITORING OF A CHARACTERISTIC OF A SYSTEM

(71) Applicant: Intel Corporation, Santa Clara, CA (US)

(72) Inventors: Indrajit Manna, Dublin (IE); Jakub Wenus, Maynooth (IE); Mariano J. Phielipp, Mesa, AZ (US); Suraj Sindia, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 15/393,909

(22) Filed: Dec. 29, 2016

(65) Prior Publication Data
US 2018/0189659 A1    Jul. 5, 2018

(51) Int. Cl.
*G06F 11/07*    (2006.01)
*G06F 11/30*    (2006.01)
*G06N 3/04*    (2006.01)

(52) U.S. Cl.
CPC ...... *G06F 11/3089* (2013.01); *G06F 11/0709* (2013.01); *G06F 11/0751* (2013.01); *G06N 3/0445* (2013.01)

(58) Field of Classification Search
CPC ............. G06F 11/3089; G06F 11/0709; G06F 11/0751; G06N 5/04
See application file for complete search history.

(56) References Cited

U.S. PATENT DOCUMENTS

| | | | |
|---|---|---|---|
| 2006/0036403 A1 | 2/2006 | Wegerich et al. | |
| 2006/0284617 A1 | 12/2006 | Kozlowski et al. | |
| 2012/0191439 A1* | 7/2012 | Meagher | G06Q 50/00 703/18 |
| 2014/0286372 A1 | 9/2014 | Kobayashi et al. | |
| 2016/0069753 A1 | 3/2016 | Phan Le et al. | |
| 2017/0302741 A1* | 10/2017 | Conner | H04L 67/125 |

FOREIGN PATENT DOCUMENTS

WO    2015-139980 A1    9/2015

OTHER PUBLICATIONS

International search report for PCT application No. PCT/US2017/063688, dated Mar. 8, 2018 (3 pages).
Written opinion for PCT application No. PCT/US2017/063688, dated Mar. 8, 2018 (8 pages).

* cited by examiner

*Primary Examiner* — Bryan Bui
(74) *Attorney, Agent, or Firm* — Barnes & Thornburg LLP

(57) ABSTRACT

Technologies for monitoring a characteristic of a monitored system include determining a measured value of the primary characteristic of the monitored system sensed by a primary sensor and a measured value of the secondary characteristic of the monitored system sensed by a secondary sensor, and predicating a predicted value of the primary characteristic based on the measured value of the secondary characteristic. The measured and predicted values of the primary characteristic are used to determine whether the primary sensor is properly functioning.

22 Claims, 5 Drawing Sheets

TECHNOLOGIES FOR PREDICTIVE MONITORING OF A CHARACTERISTIC OF A SYSTEM

BACKGROUND

The Internet-of-Things ("IoT") is a concept of an interconnected network of "smart" objects or devices, each of which is embedded with hardware and/or software that enable connectivity to the network. An object, device, sensor, or "thing" (also referred to as an "IoT device") that is connected to a network typically provides information to a manufacturer, operator, and/or other connected devices in order to track usage of the object and/or obtain services. However, if the enormous amount of data that is collected at the sensor is not somehow managed before sending the corresponding data to the gateway, a network overload can quickly occur as the volume of data grows, thereby slowing down any data exchange.

Neural networks are a class of electronic circuits which emulate higher-order brain functions such as memory, learning, and/or perception/recognition. Such networks are configured to adopt a parallel approach to problem solving in which pattern recognition and mapping problems can be solved in thousandths of the time required by a conventional Von-Neuman computer with its single-instruction cycle times.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
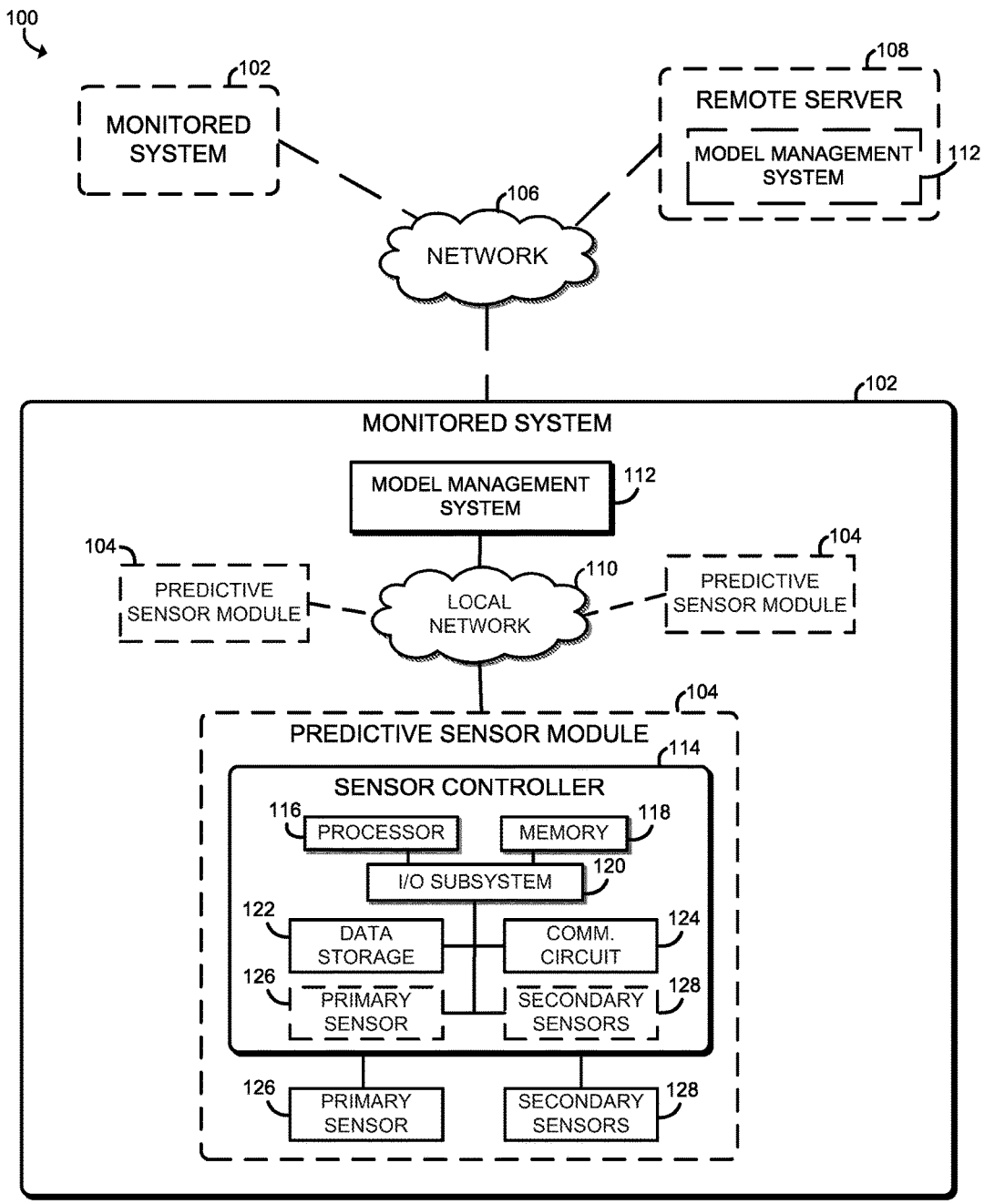
FIG. 1 is a simplified block diagram of at least one embodiment of a system for monitoring a characteristics of a monitored system using a predictive sensor module.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for monitoring a characteristic of a monitored system 102 includes one or more predictive sensor modules 104, which may form a portion of the monitored system 102. Each predictive sensor module 104 is configured to monitor a primary characteristic of the monitored system 102. The primary characteristic may be embodied as any type of aspect or characteristic of the monitored system 102 capable of being sensed, measured, or otherwise monitored by one or more sensors. The particular type of primary characteristic that is to be monitored may depend on, for example, the type of the monitored system 102. Additionally, as discussed in detailed below, the predictive sensor module 104 also monitors a secondary characteristic that is indicative of, or otherwise relates to, the primary characteristic. The secondary characteristic is used as an input to a predictive model managed by the predictive sensor module 104 to predict a value of the primary characteristic. The measured and predictive primary characteristic values are compared with each to provide an indication as to the accuracy of the predictive model. To account for aging or gradual shift of various parameters of the monitored system 102, the predictive sensor module 104 may adjust or modify the predictive model based on the comparison of the measured and predictive primary characteristic values. The predictive model may also be used to predict certain events related to the primary characteristic such as, for example, when the next oil change should occur, when an filter should be changed, when a light should be replaced, etc.

For example, in an illustrative embodiment, the monitored system 102 may be embodied as vehicle. In such an embodiment, the primary characteristic may be, for example, a brake pad thickness, and the secondary characteristic may be, for example, a mileage of the vehicle since the last brake pad change. As such, the secondary characteristic (i.e., mileage) is indicative of the primary characteristic (i.e., brake pad thickness). In that illustrative embodiment, the predictive sensor module 104 is configured to monitor brake pad wear by measuring the primary characteristic and validating such measurements based on the measurement of the secondary characteristic (i.e., mileage). To do so, the predictive sensor module 104 is configured to predict a value of the brake pad thickness using a predictive model with the mileage of the vehicle since the last brake pad change as an input. Of course, in some embodiments, the predictive model may accept multiple secondary characteristics as inputs, which may be similar or different from each other. Depending on the difference between the measured and predicted thicknesses of the brake pad, the predictive sensor module 104 may adjust the predictive model to accurately predict the remaining thickness of the brake pad in order to determine the next brake pad change. Additionally, in some embodiments, the predictive sensor module 104 of one brake pad may communicate with a predictive sensor module 104 of another brake pad over a local network to synchronize the predictive model among the predictive sensor modules 104 as discussed more generally below.

Referring back to FIG. 1, the monitored system 102 may be embodied as any type of type of device, structure, or system having various aspects or characteristics capable of being sensed. The monitored system 102 may be embodied as a self-contained system such as a vehicle, a compute device, or a building; or may be embodied as a distributed system such as a heating, ventilation, and air condition (HVAC) system, a computer network, or a power delivery system. As shown in FIG. 1, the illustrative monitored system 102 includes one or more predictive sensor modules 104, a local network 110, and a model management system 112. Of course, the monitored system 102 may include other or additional components, depending on the type and/or nature of the monitored system 102, which are not shown in FIG. 1 for clarity of the description. For example, in those embodiments in which the monitored system 102 is embodied as a vehicle, the monitored system 102 includes the additional components commonly found in a vehicle such as an engine, a braking system, an infotainment system, etc.

As illustratively shown in FIG. 1, the predictive sensor module 104 includes a sensor controller 114, a primary sensor 126, and one or more secondary sensors 128. In the illustrative predictive sensor module 104, the primary sensor 126 and the secondary sensors 128 are remotely positioned from the sensor controller 114. However, in other embodiments, the primary sensor 126 and/or the secondary sensor(s) 128 may be integrated with the sensor controller 114 (e.g., on a system-on-a-chip (Soc)). The sensor controller 114 is configured to communicate with the primary sensor 126 and secondary sensors 128 to receive corresponding sensor data. The primary sensor 126 is configured to measure a primary characteristic of the monitored system 102 and generate primary sensor data indicative of the primary characteristic. Each secondary sensor 128 is configured to measure a secondary characteristic of the monitored system 102 and generate a secondary sensor data indicative of a secondary characteristic, which is different from the primary characteristic. Additionally, each secondary sensor 128 may be configured to measure the same or a different secondary characteristic. For example, in some embodiments, multiple secondary characteristics may be measured by corresponding secondary sensors 128.

The sensor controller 114 may be embodied as any type of controller or compute device capable of performing the functions described herein. The illustrative sensor controller 114 includes a processor 116, a memory 118, an input/output (I/O) subsystem 120, a data storage 122, and a communication circuit 124. Of course, the sensor controller 114 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 118, or portions thereof, may be incorporated in the processor 116 in some embodiments.

The processor 116 may be embodied as any type of processor capable of performing the functions described herein. For example, the processor 116 may be embodied as a single or multi-core processor(s), digital signal processor, microcontroller, or other processor or processing/controlling circuit. Similarly, the memory 118 may be embodied as any type of volatile or non-volatile memory or data storage capable of performing the functions described herein. In operation, the memory 118 may store various data and software used during operation of the sensor controller 114 such as applications, programs, libraries, and drivers. The memory 118 is communicatively coupled to the processor 116 via the I/O subsystem 120, which may be embodied as circuitry and/or components to facilitate input/output operations with the processor 116, the memory 118, and other components of the sensor controller 114. For example, the I/O subsystem 120 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SoC) and be incorporated, along with the processor 116, the memory 118, and other components of the sensor controller 114, on a single integrated circuit chip.

The data storage 122 may be embodied as any type of device or devices configured for short-term or long-term storage of data such as, for example, memory devices and circuits, memory cards, hard disk drives, solid-state drives, or other data storage devices. In some embodiments, the data storage 122 may form a portion of the memory 118. In the illustrative embodiment, the predictive sensor module 104 may be configured to store a predictive model and model parameters in the data storage 122.

The communication circuit 124 may be embodied as any type of communication circuit, device, or collection thereof, capable of enabling communications between the predictive sensor module 104 and the model management system 112 and/or other predictive sensor modules 104 over a local network 110. To do so, the communication circuit 124 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The model management system 112 is configured to communicate with one or more predictive sensor modules 104 to store and update the predictive model of the predictive sensor module(s) 104. For example, in those embodiments in which the monitored system 102 includes multiple predictive sensor modules 104, the model management system 112 is configured to update and synchronize the most-up-to-date predictive model of the predictive sensor modules 104. However, it should be appreciated that, in some embodiments, the individual predictive model of each predictive sensor module 104 may be asynchronous.

In the illustrative embodiments, the model management system 112 communicates with the predictive sensor modules 104 of the monitored system 102 over the local network 110. The local network 110 may be embodied as any type of communication network capable of facilitating such communications. As such, the local network 110 may include any type of infrastructure and/or other components or intervening devices to support such communications, depending on the type of monitored system 102. For example, in those embodiments, in which the monitored system 102 is embodied as a vehicle, the local network 110 may be embodied as a controller area network (CAN). Alternatively, in those embodiments in which the monitored system 102 is a distributed system, the local network 110 may be embodied as a local or wide area network, a cellular network, or form a portion of a larger, public network (e.g., the Internet).

In some embodiments, the model management system 112 may be located remotely from the monitored system 102. For example, as shown in FIG. 1, the model management system 112 may be incorporated in a remote server 108. In such embodiments, the predictive sensor modules 104 of the monitored system 102 may communicate with the model management system 112 of the remote server 108 over a network 106. As discussed above, the remote model management system 112 is configured to store and update (e.g., synchronize) the predictive model of the predictive sensor module(s) 104. Additionally, in such embodiments, the remote model management system 112 may also manage other monitored systems 102 of the system 100. In such embodiments, the remote model management system 112 may manage and update predictive models used by the other monitored systems 102, which may be the same or different.

The network 106 may be embodied as any type of communication network capable of facilitating communication between the monitored system 102 and the remote server 108 and/or between a multiple monitored systems 102. As such, the network 106 may include one or more networks, routers, switches, computers, and/or other intervening devices. For example, the network 106 may be embodied as or otherwise include one or more local or wide area networks, cellular networks, publicly available global networks (e.g., the Internet), an ad hoc network, a short-range communication network or link, or any combination thereof.

Figure 2:
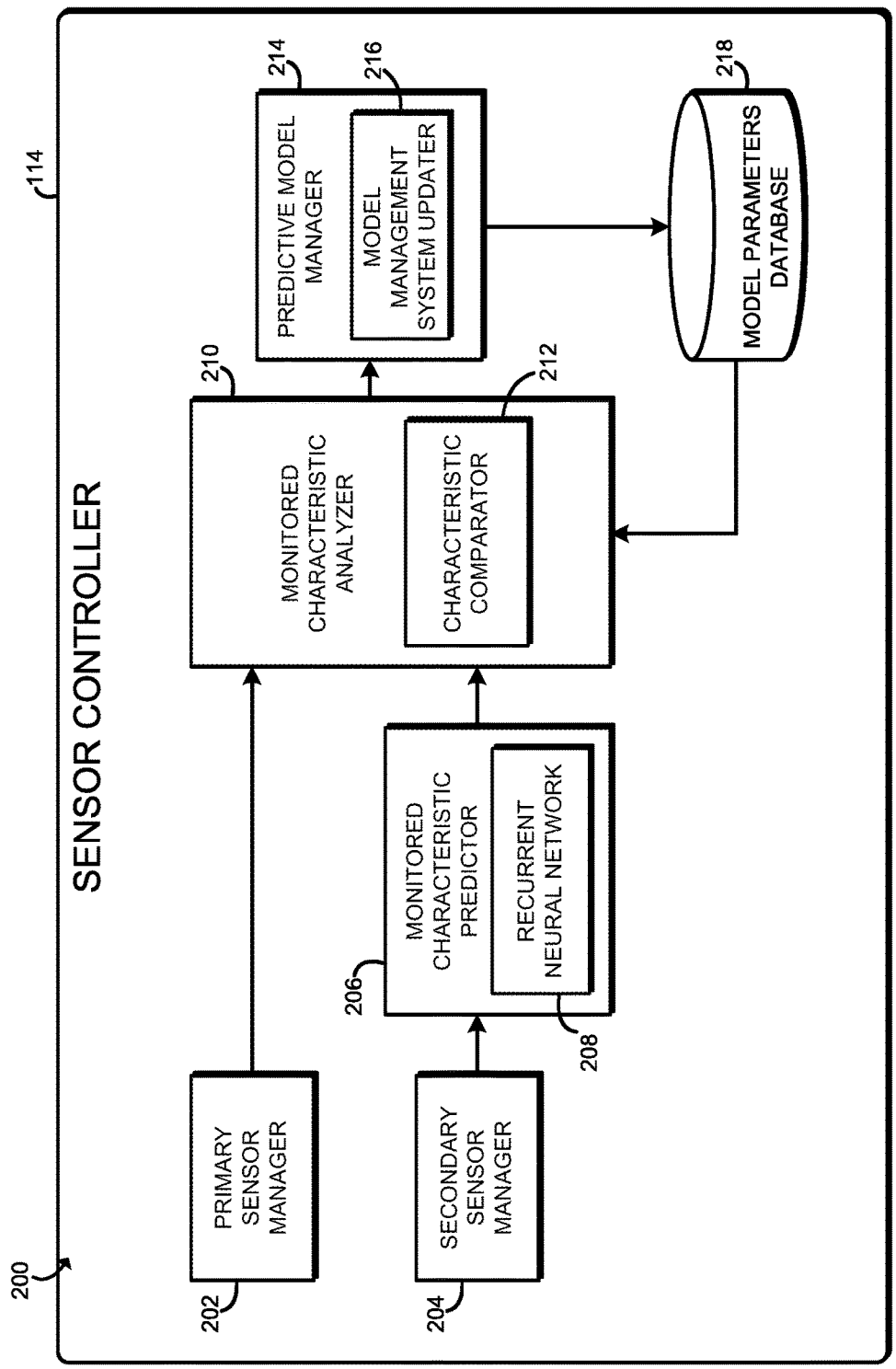
FIG. 2 is a simplified block diagram of at least one embodiment of an environment that may be established by a sensor controller of the predictive sensor module of FIG. 1.

Referring now to FIG. 2, in use, the sensor controller 104 establishes an environment 200 for monitoring and updating the predictive model of the predictive sensor module 104. As discussed above, the predictive model is embodied as a mathematical model or algorithm that takes one or more secondary characteristic measured values as inputs and produces a predicted value of the primary characteristic. As discussed in more detail below, the predictive model is embodied as a recurrent neural network in the illustrative embodiment, but may be embodied as other types of predictive models in other embodiments.

The illustrative environment 200 includes a primary sensor manager 202, a secondary sensor manager 204, a monitored characteristic predictor 206, a monitored characteristic analyzer 210, a predictive model manager 214, and a model parameters database 218. The various components of the environment 200 may be embodied as hardware, firmware, software, or a combination thereof. As such, in some embodiments, one or more of the components of the environment 200 may be embodied as circuitry or collection of electrical devices (e.g., a primary sensor manager circuit 202, a secondary sensor manager circuit 204, a monitored characteristic predictor circuit 206, a monitored characteristic analyzer 210, a predictive model manager circuit 214, etc.). It should be appreciated that, in such embodiments, one or more of the primary sensor manager circuit 202, the secondary sensor manager circuit 204, the monitored characteristic predictor circuit 206, the monitored characteristic analyzer 210, and/or the predictive model manager circuit 214 may form a portion of one or more of the processor 116, the I/O subsystem 120, the communication circuit 124, and/or other components of the predictive sensor module 104. Additionally, in some embodiments, one or more of the illustrative components of the environment 200 may form a portion of another component and/or one or more of the illustrative components may be independent of one another.

The primary sensor manager 202 is configured to determine a measured value of the primary characteristic based on the primary sensor data received from the primary sensor 126. For example, depending on the implementation and/or type of primary sensor 126, the primary sensor data may be embodied as a voltage or current value, and the primary sensor manager 202 may convert the voltage or current value to a value of the primary characteristic (e.g., a temperature value, a brake thickness measurement, etc.). In a similar manner, the secondary sensor manager 204 is configured to determine measured values of the secondary characteristic based on the secondary sensor data received from the one or more secondary sensors 128. In the illustrative embodiment, the primary and secondary managers 202, 204 are embodied as, or otherwise includes, analog-to-digital converters. Of course, the primary and secondary managers 202, 204 may be embodied as, or otherwise include, other components in other embodiments.

Using the measured values of the secondary characteristic as inputs, the monitored characteristic predictor 206 predicts a predicted value of the primary characteristic using the predictive model. As discussed above, in the illustrative embodiment, the predictive model is embodied as a recurrent neural network (RNN) 208. The RNN 208 exhibits an internal memory and is capable of remembering the previous measured values, such as previously measured values of the secondary characteristic, previously measured values of the primary characteristic, and/or previously predicted values of the primary characteristic. The RNN 208 includes a number of weight values and/or parameters, that may be adjusted to modify the behavior of the RNN 208. As discussed in detail below, the weights or parameters of the RNN 208 may be updated or modified over time to gradually adjust the predictive model to compensate for the aging or gradual shifting of various parameters of the monitored system 102.

In the illustrative embodiment, the RNN 208 may consider the present measured values of the secondary characteristic as well as the previously measured values of the secondary characteristic to predict a value of the primary characteristic. The RNN 208 determines an average of the measured value of the secondary characteristic and the previously measured value of the secondary characteristic, and predicts a value of the primary characteristic using the average value of the secondary characteristic as an input to the predictive model. By determining the predicted value of the primary characteristic based on the average value of the secondary characteristic, the RNN 208 may prevent any sporadic sudden changes or errors in the measured values of the secondary characteristic to drastically affect the adjustment of the predictive model as discussed below. As a result, the use of the RNN 208 as the predictive model allow a gradual adjustment of the predictive model by considering a smaller disparity between the measured value of the primary characteristic and the average of the measured values of the secondary characteristic.

It should be appreciated that, in some embodiments that include the RNN 208 as the predictive model, the monitored characteristic analyzer 210 may consider the measured values of the secondary characteristic and the previously measured value of the primary characteristic to predict a value of the primary characteristic. In other embodiments that include the RNN 208 as the predictive model, the monitored characteristic analyzer 210 may consider the measured values of the secondary characteristic and the previously predicted value of the primary characteristic to predict a value of the primary characteristic. By considering the previously measured and/or previously predicted value of the primary characteristic, the disparity between the currently measured and predicted values of the primary characteristic decreases, allowing a gradual adjustment of the predictive model.

The monitored characteristic analyzer 210 is configured to analyze the measured primary characteristic value determined by the primary sensor manager 202 and the predicted primary characteristic value determined by the monitored characteristic predictor 206. In the illustrative embodiment, the monitored characteristic analyzer 210 includes a characteristic comparator 212, which is configured to compare the measured value of the primary characteristic and the predicted value of the primary characteristic and to determine a difference (i.e., a degree of disparity) between those values.

The difference between the measured and predictive values of the primary characteristic determined by the monitored characteristic analyzer 210 is provided to the predictive model manager 214. The predictive model manager 214 is configured to determine whether the predictive model should be adjusted based on the degree of disparity between the measured and predicted values of the primary characteristic. To do so, the predictive model manager 214 compares the difference between the measured and predicted values of the primary characteristic to one or more predetermined reference thresholds. As illustratively shown in FIG. 2, the predictive model manager 214 further includes a model management system updater 216, which is configured to adjust the predictive model by updating the model parameters stored in the model parameters database 218 based on the comparison of the determined difference and the one or more predetermined reference thresholds.

In the illustrative embodiment, the predictive model manager 214 compares the difference between the measured and predicted values of primary characteristic to an ideal reference threshold that indicates a predetermined ideal range of the first characteristic of the monitored system 102. If the difference is within the ideal range of the first characteristic, the predictive model manager 214 determines that the model parameters need not be adjusted because the predictive model is accurate and the primary sensor is operating correctly. If, however, the predictive model manager 214 determined that the difference is not within the ideal range, the predictive model manager 214 determines that the predictive model should be adjusted. To do so, the model management system updater 216 updates the model parameters of the predictive model based on at least one of the measured value of the primary characteristic, the measured values of the secondary characteristic, or the difference. It should be appreciated that the updated model parameters may be stored in the model parameters database 218. In some embodiments, if the difference is greater than an upper reference threshold (e.g., greater than a maximum allowed value), the predictive model manager 214 may determine that the primary sensor 126 (and/or the secondary sensor(s) 128) is malfunctioning or otherwise inoperable. In such cases, an alert or remediation action may be taken.

Figure 3:
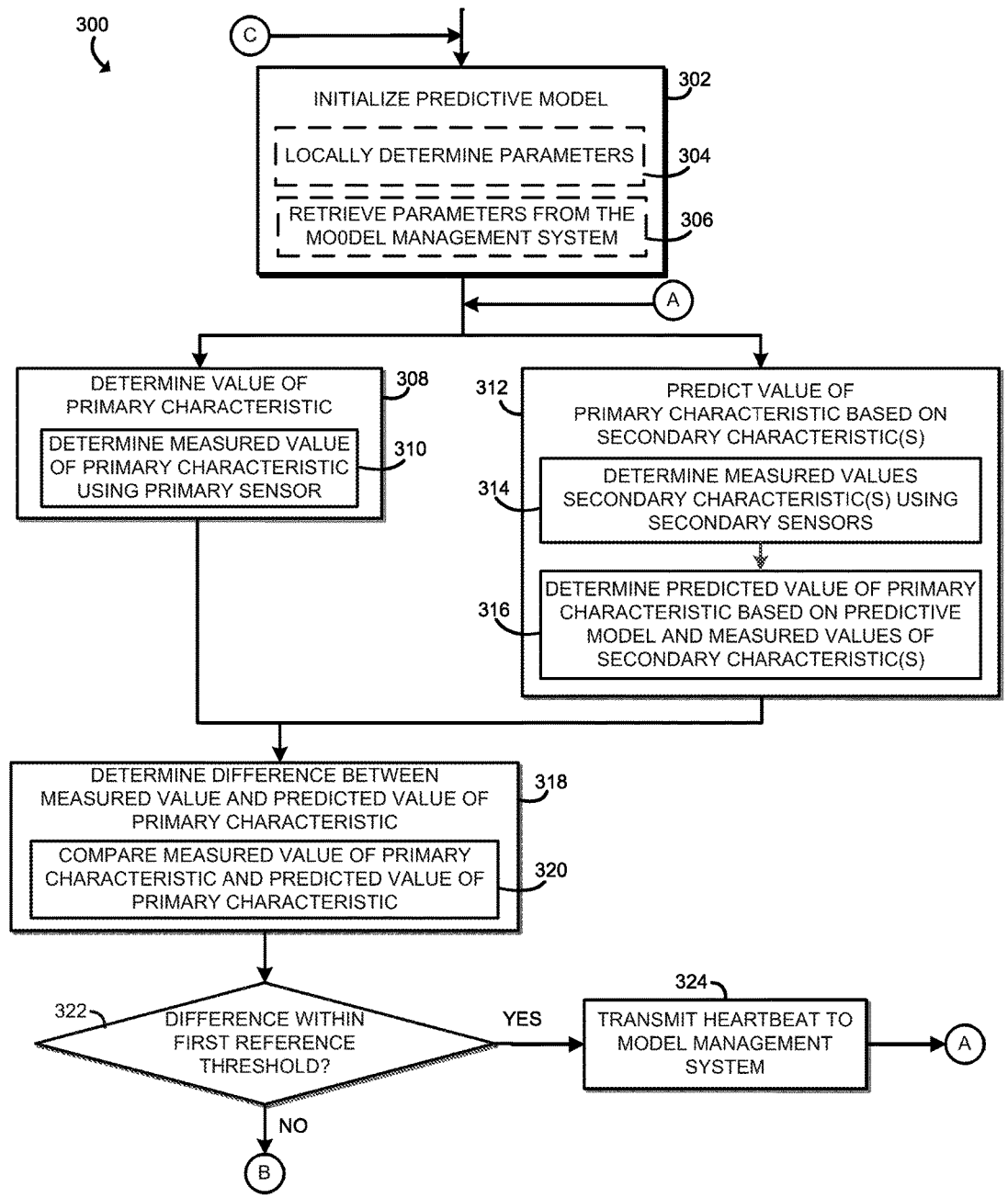
FIGS. 3-4 are a simplified flow diagram of at least one embodiment of a method for monitoring a characteristic of the monitored system that may be executed by the sensor controller of FIGS. 1 and 2.
Figure 4:
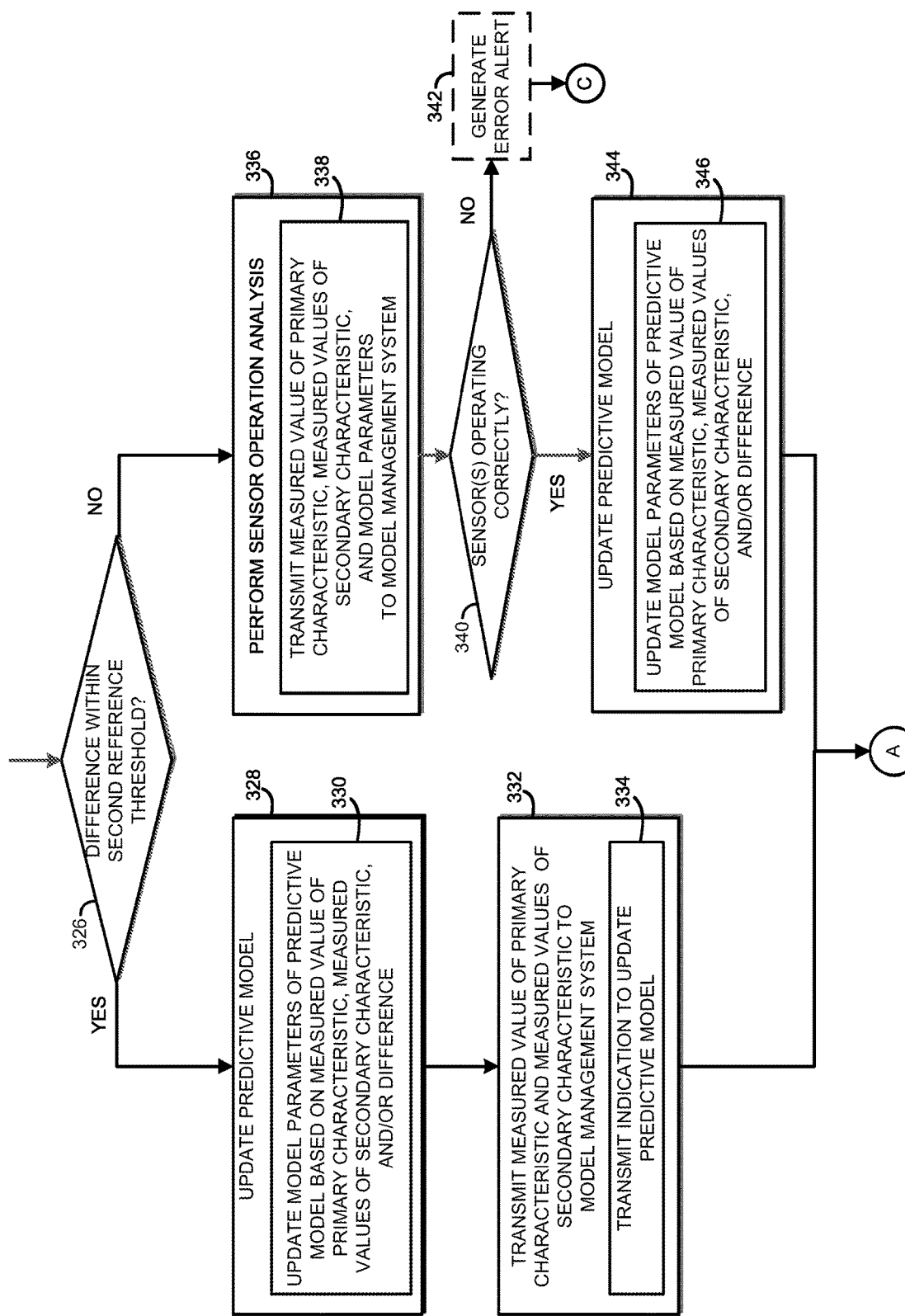

Referring now to FIGS. 3-4, in use, the sensor controller 114 of the predictive sensor module 104 may execute a method 300 for monitoring a characteristic of the monitored system 102. The method 300 begins with block 302 in which the sensor controller 114 initializes the predictive model (e.g., the RNN 208) of the predictive sensor module 104. For example, in some embodiments, the predictive model may be initialized using initial model parameters locally stored in the predictive sensor module 104 in block 304. In other embodiment, the predictive sensor module 104 may retrieve the model parameters from the model management system 112, which may be located locally on the monitored system 102 or on the remote server 108, in block 306.

After the sensor controller 114 has initialized the predictive model, the method 300 advances to blocks 308 and 312. In block 308, the sensor controller 114 determines a value of a primary characteristic of the monitored system 102. To do so, the sensor controller 114 determines, in block 310, the measured value of the primary characteristic based on the primary data received from the primary sensor 126. For example, in some embodiments, the sensor controller 114 may convert voltage and/or current signals received from the primary sensor 126 to measured values of the primary characteristic in block 310. After the measured value of the primary characteristic has been determined in block 308, the method 300 advances to block 318 discussed below.

Contemporaneously, in block 312, the sensor controller 114 predicts a value of the primary characteristic based on at least one secondary characteristic value. To do so, in block 314, the sensor controller 114 determines the measured values of the secondary characteristic based on the secondary data received from the secondary sensor 128. Again, in some embodiments, the sensor controller 114 may convert voltage and/or current signals received from the secondary sensor(s) 126 to measured values of the primary characteristic in block 314. In block 316, the sensor controller 114 determines a predicted value of the primary characteristic based on the measured values of the secondary characteristic using the predictive model. To do so, in the illustrative embodiment, the sensor controller 114 utilizes the RNN 208 to predict the value of the primary characteristic using the measured value(s) of the secondary characteristic as input to the RNN 208. As discussed above, the RNN 208 may utilize historic values of the secondary characteristics and/or historic predicted values of the primary characteristic in the determination of the present predicated primary characteristic value.

In block 318, the sensor controller 114 determines a difference between the measured value of the primary characteristic and the predicted value of the primary characteristic. To do so, in block 320, the sensor controller 114 compares the measured value of the primary characteristic and the predicted value of the primary characteristic to determine the difference between those values. Once the difference in the predicted and measured values is determined, the method 300 proceeds to block 322 in which the sensor controller 114 determines whether the difference is within a first reference threshold. In the illustrative embodiment, the first reference threshold defines an ideal threshold.

If the predictive sensor module 104 determines that the difference is within the first reference threshold, the method 300 advances to block 324 in which the sensor controller 114 transmits a heartbeat to the model management system 112. The heartbeat provides an indication to the model management system 112 that the predictive sensor module 104 is operational, because no sensor data will be transmitted under such a situation. In embodiments in which the model management system 112 is included in the monitored system 102, the sensor controller 114 may transmit the heartbeat to the model management system 112 over the local network 110. Alternatively, in embodiments in which the model management system 112 is included in the remote server 108, the sensor controller 114 may transmit the heartbeat to the model management system 112 over the network 106. Regardless, after the sensor controller 114 has transmitted the heartbeat, the method 300 loops back to blocks 308 and 312 in which the measured and predicted values of the primary characteristic are determined, respectively.

Referring back to block 322, if the sensor controller 114 determines that the difference is not within the first reference threshold, the method 300 advances to block 326 of FIG. 4. In block 326, the sensor controller 114 determines whether the difference is the within a second reference threshold. In the illustrative embodiment, the second reference threshold defines an acceptable threshold, which is greater than the first reference threshold. If sensor controller 114 determines the difference is the within a second reference threshold, the method 300 advances to block 328 in which the sensor controller 114 updates predictive model. To do so, in the illustrative embodiment, the sensor controller 114 updates or modifies the weights or parameters of the predictive model (e.g., the RNN 208) in block 330. The update to the model parameters may be based on one or more of the difference between the measured and predictive values of the primary characteristic, the measured value of the primary characteristic, and/or the measured value of the secondary characteristic. After the sensor controller 114 has updated the predictive model stored on the predictive sensor module 104, the method 300 advances to block 332. In block 332, the sensor controller 114 transmits the measured value of primary characteristic and the measured value of the secondary characteristic to the model management system 112. The sensor controller 114 may also transmit an indication to the model management system 112 that the predictive model stored or managed by the model management system 112 should also be updated in block 334. In this way, the model management system 112 may update the predictive model stored in the model management system 112 and distribute the updated predictive model to any other predictive sensor modules 104 managed by that particular model management system 112.

If, however, the sensor controller 114 determines that the difference between the measured and predictive values of the primary characteristic is not with the secondary reference threshold in block 326, the method 300 advances to block 336. In block 336, the sensor controller 114 performs a sensor operation analysis to ensure the primary sensor 126 is operating correctly. That is, if the difference between the measured and predictive primary characteristic values is greater than an allowable threshold, the sensor controller 114 may perform certain analyses on the primary sensor 126 and/or the measured values of the primary characteristic to determine whether the primary sensor 126 is operating correctly. Additionally, in some embodiments, the sensor controller 114 may transmit, in block 338, the measured value of the primary characteristic, the measured values of the secondary characteristic, and the model parameters to the model management system 112. The model management system 112 may perform its own analyses of the measured and/or predicted values and/or the model parameters to determine whether and/or where any error may be occurring.

In block 340, the sensor controller determines whether the primary sensor 126 is operating correctly based on the analysis performed in block 336. If the sensor controller 114 determines that the primary sensor 126 is not operating correctly, the method 300 advances to block 342 in which the sensor controller 114 generates an error alert. To do so, in some embodiments, the sensor controller 114 may generate a local alert, which may be embodied as a visual, audible, and/or tactile alert. Additionally or alternatively, the sensor controller 114 may transmit the error alert to the model management system 112, which may generate a local alert and/or transmit other alerts to other components of the system 100. Regardless, after the sensor controller 114 generates the error alert, the method 300 loops back to block 302 of FIG. 3 in which the predictive model is again reinitialized. It should be appreciated that, in some embodiments, the sensor controller 114 may also determine whether one or more secondary sensors 128 is operating correctly in blocks 336 and 340.

Referring back to block 340, if the sensor controller 114 determines that the primary sensor 126 is operating correctly, the method 300 advances to block 344. In block 344, the sensor controller 114 updates the local predictive model. To do so, in the illustrative embodiment, the sensor controller 114 updates or modifies the weights or parameters of the predictive model (e.g., the RNN 208) in block 346. As discussed above, the update to the model parameters may be based on one or more of the difference between the measured and predictive values of the primary characteristic, the measured value of the primary characteristic, and/or the measured value of the secondary characteristic. Additionally, the model management system 112 may update its predictive model based on the values and parameters sent by the sensor controller 114 in block 338. Regardless, after the predictive model has been updated, the method 300 loops back to blocks 308 and 312 of FIG. 3 in which the measured and predicted values of the primary characteristic are determined, respectively.

Figure 5:
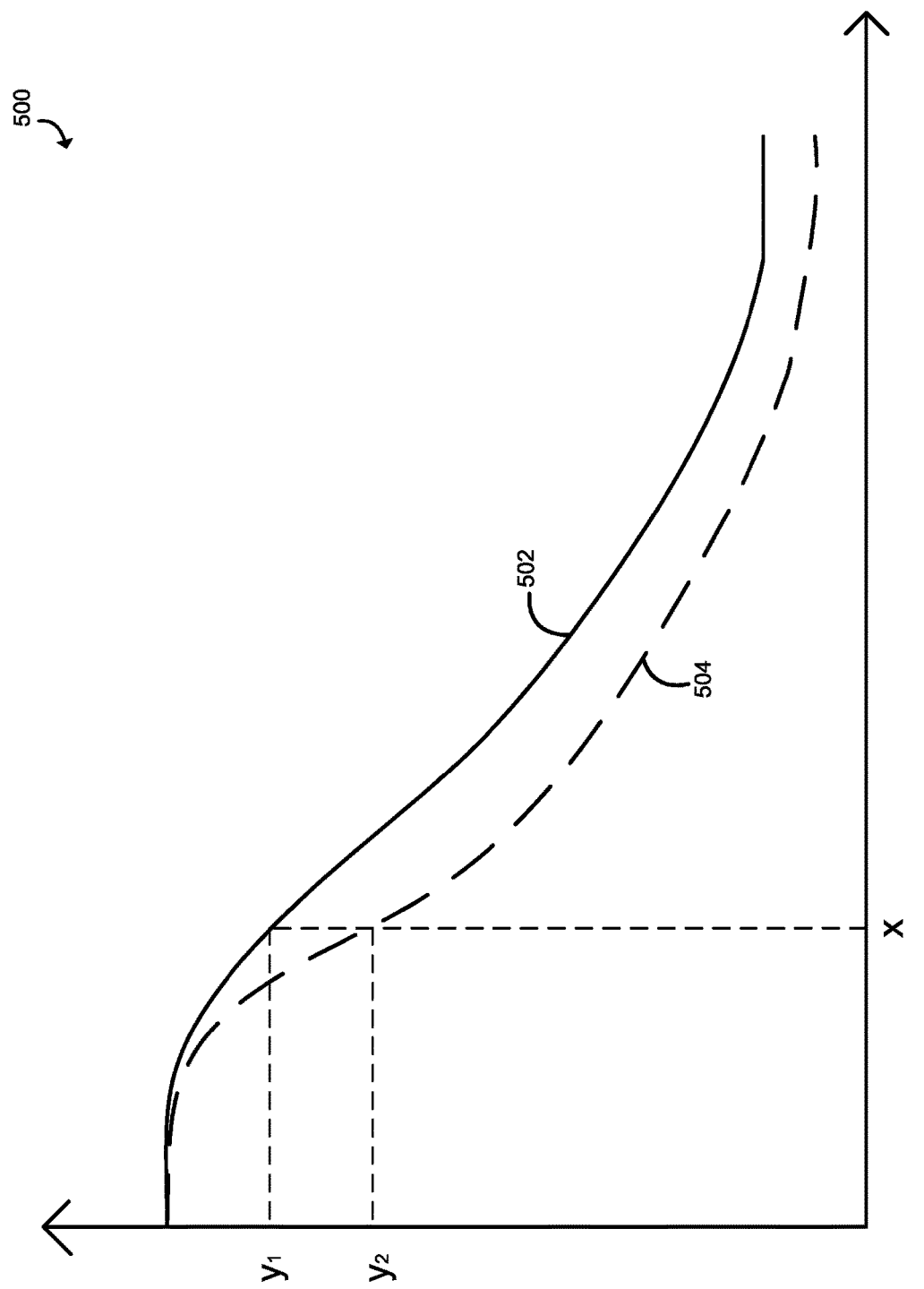
FIG. 5 is a graph that illustrates an initial predictive model and an updated predictive model of an illustrative embodiment of the sensor controller of FIGS. 1 and 2.

Referring now to FIG. 5, a graph 500 illustrates a trend line 502 representing a present predictive model of the predictive sensor module 104. If the sensor controller 114 determines, using the method 400 as discussed above, the disparity between the measured and predicted values of the primary characteristic is greater than the predetermined threshold, the present predictive model 502 is adjusted to an updated predictive model illustrative shown as a dotted trend line 504. Again, referring back to the vehicle example above, the monitored system 102 may be a vehicle, the primary characteristic may be brake pad thickness, and the predictive sensor module 104 may be a sensor module for monitoring a corresponding brake pad. In such am example, the predictive model is configured to predict the brake pad wear over time. In that example, the horizontal axis (or x-axis) of the graph 500 represents time, and the vertical axis (or y-axis) represents a thickness of a brake pad. As such, the trend line 502 may represent an initial predictive model of an ideal brake pad wear over time. At time x, the sensor controller 114 predicts that the brake pad thickness is $y_1$ inch according to the predictive model; however, the brake pad thickness actually measured by the primary sensor 126 at time X is $y_2$ inch. If the sensor controller 114 determines that the difference between the measured and predicted thicknesses of the brake pad is outside of the ideal range, the initial predictive model 502 is adjusted to an updated predictive model shown as the dotted trend line 504. The updated predictive model 504 illustrates that the brake pad has worn faster than the rate expected by the initial predictive model. It should be appreciated that the shape and trend of the trend line 502, 504 is a shown as a generic trend, not specific to this example, and may vary depending on the monitored system 102 and the primary characteristic, as well as other factors.

EXAMPLES

Illustrative examples of the technologies disclosed herein are provided below. An embodiment of the technologies may include any one or more, and any combination of, the examples described below.

Example 1 includes a predictive sensor module to monitor a characteristic of a monitored system, the predictive sensor module comprising a primary sensor to produce primary sensor data indicative of a primary characteristic of the monitored system; one or more secondary sensors to produce secondary sensor data indicative of a secondary characteristic, different from the primary characteristic, of the monitored system; and a sensor controller to (i) determine a measured value of the primary characteristic based on the primary sensor data, (ii) determine a measured value of the secondary characteristic based on the secondary sensor data, (iii) predict a predicted value of the primary characteristic using a predictive model with the measured value of the secondary characteristic as an input to the predictive model, and (iv) determine whether to update the predicted model based on a comparison of the measured value and the predicted value of the primary characteristic.

Example 2 includes the subject matter of Example 1, and wherein the predictive model is a recurrent neural network.

Example 3 includes the subject matter of any of Examples 1 and 2, and wherein the predictive model comprises a plurality of model parameters.

Example 4 includes the subject matter of any of Examples 1-3, and wherein the sensor controller is further to update one or more of the plurality of model parameters in response to a determination that the predicted model is to be updated.

Example 5 includes the subject matter of any of Examples 1-4, and wherein to determine whether to update the predicted model comprises to determine a difference between the measured value of primary characteristic and the predicted value of primary characteristic.

Example 6 includes the subject matter of any of Examples 1-5, and wherein to determine whether to update the predicted model further comprises to determine whether the difference is within a first reference threshold.

Example 7 includes the subject matter of any of Examples 1-6, and wherein the first reference threshold indicates a predetermined ideal range.

Example 8 includes the subject matter of any of Examples 1-7, and wherein the sensor controller is further to transmit, in response to a determination that the difference is within the first reference threshold, a heartbeat signal to a model management system that indicates a predictive model managed by the model management system does not need updated.

Example 9 includes the subject matter of any of Examples 1-8, and wherein to determine whether to update the predicted model further comprises to determine whether the difference is within a second reference threshold in response to a determination that the difference is not within the first reference threshold.

Example 10 includes the subject matter of any of Examples 1-9, and wherein the second reference threshold indicates a predetermined acceptable range.

Example 11 includes the subject matter of any of Examples 1-10, and wherein the sensor controller is further to update the predictive model in response to a determination that the difference is within the second reference threshold and not within first reference threshold.

Example 12 includes the subject matter of any of Examples 1-11, and wherein to update the predictive model comprises to update a plurality of model parameters of the predictive model based on at least one of the measured value of primary characteristic, the measured value of secondary characteristic, or the difference.

Example 13 includes the subject matter of any of Examples 1-12, and wherein the sensor controller is further to perform, in response to a determination that the difference is not within the second reference threshold, a sensor operation analysis to determine whether the primary sensor is operating correctly.

Example 14 includes the subject matter of any of Examples 1-13, and wherein to perform the sensor operation analysis comprises to transmit the measured value of the primary characteristic, the measured value of secondary characteristic, and a plurality of model parameters to a model management system, wherein the plurality of model parameters comprise the predictive model used to predict the predicted value of the primary characteristic based on the measured value of the secondary characteristic.

Example 15 includes the subject matter of any of Examples 1-14, and wherein the sensor controller is further to update the predictive model in response to a determination that the difference is not within the second reference threshold.

Example 16 includes the subject matter of any of Examples 1-15, and wherein to update the predictive model comprises to update a plurality of model parameters of the predictive model based on at least one of the measured value of primary characteristic, the measured value of secondary characteristic, or the difference.

Example 17 includes the subject matter of any of Examples 1-16, and further including a plurality of secondary sensors, wherein each secondary sensor is to produce secondary sensor data indicative of a different secondary characteristic, different from the primary characteristic and other secondary characteristics, of the monitored system; and wherein the sensor controller is to (i) determine a measured value of each secondary characteristic based on the corresponding secondary sensor data and (ii) predict the predicted value of the primary characteristic using the predictive model with each of the measured values of the secondary characteristic as inputs to the predictive model.

Example 18 includes the subject matter of any of Examples 1-17, and wherein the primary sensor and the one or more secondary sensors form a portion of the sensor controller.

Example 19 includes a method for monitoring a characteristic of a monitored system, the method comprising producing, by a primary sensor, primary sensor data indicative of a primary characteristic of the monitored system; producing, by a secondary sensor, secondary sensor data indicative of a secondary characteristic, different from the primary characteristic, of the monitored system; determining, by a sensor controller, a measured value of the primary characteristic based on the primary sensor data; determining, by the sensor controller, a measured value of the secondary characteristic based on the secondary sensor data; predicting, by the sensor controller, a predicted value of the primary characteristic using a predictive model with the measured value of the secondary characteristic as an input to the predictive model; determining, by the sensor controller, whether to update the predicted model based on a comparison of the measured value and the predicted value of the primary characteristic.

Example 20 includes the subject matter of Example 19, and wherein the predictive model is a recurrent neural network.

Example 21 includes the subject matter of any of Examples 19 and 20, and wherein the predictive model comprises a plurality of model parameters.

Example 22 includes the subject matter of any of Examples 19-21, and further including updating, by the sensor controller, one or more of the plurality of model parameters in response to determining that the predicted model is to be updated.

Example 23 includes the subject matter of any of Examples 19-22, and wherein determining whether to update the predicted model further comprises determining a difference between the measured value of primary characteristic and the predicted value of primary characteristic.

Example 24 includes the subject matter of any of Examples 19-23, and wherein determining whether to update the predicted model further comprises determining whether the difference is within a first reference threshold.

Example 25 includes the subject matter of any of Examples 19-24, and wherein the first reference threshold indicates a predetermined ideal range.

Example 26 includes the subject matter of any of Examples 19-25, and further including transmitting, by the sensor controller, in response to a determination that the difference is within the first reference threshold, a heartbeat signal to the model management system that indicates a predictive model managed by the model management system does not need updated.

Example 27 includes the subject matter of any of Examples 19-26, and wherein determining whether to update the predicted model further comprises determining whether the difference is within a second reference threshold in response to a determination that the difference is not within the first reference threshold.

Example 28 includes the subject matter of any of Examples 19-27, and wherein the second reference threshold indicates a predetermined acceptable range.

Example 29 includes the subject matter of any of Examples 19-28, and further including updating, by the sensor controller, the predictive model in response to a determination that the difference is within the second reference threshold and not within first reference threshold.

Example 30 includes the subject matter of any of Examples 19-29, and wherein updating the predictive model comprises updating a plurality of model parameters of the predictive model based on at least one of the measured value of primary characteristic, the measured value of secondary characteristic, or the difference.

Example 31 includes the subject matter of any of Examples 19-30, and further including performing, by the sensor controller and in response to a determination that the difference is not within the second reference threshold, a sensor operation analysis to determine whether the primary sensor is operating correctly.

Example 32 includes the subject matter of any of Examples 19-31, and wherein performing the sensor operation analysis comprises transmitting the measured value of primary characteristic, the measured value of secondary characteristic, and a plurality of model parameters to a model management system, wherein the plurality of model parameters comprise a predictive model used to predict the predicted value of the primary characteristic based on the measured value of the secondary characteristic.

Example 33 includes the subject matter of any of Examples 19-32, and further including updating, by the sensor controller, the predictive model in response to a determination that the difference is not within the second reference threshold.

Example 34 includes the subject matter of any of Examples 19-33, and wherein updating the predictive model comprises updating a plurality of model parameters of the predictive model based on at least one of the measured value of primary characteristic, the measured value of secondary characteristic, or the difference.

Example 35 includes the subject matter of any of Examples 19-34, and further including producing, by each of a plurality of secondary sensors, secondary sensor data indicative of a different secondary characteristic, different from the primary characteristic and other secondary characteristics, of the monitored system; and further comprising determining, by the sensor controller, a measured value of each secondary characteristic based on the corresponding secondary sensor data and (ii) predicting, by the sensor controller, the predicted value of the primary characteristic using the predictive model with each of the measured values of the secondary characteristic as inputs to the predictive model.

Example 36 includes the subject matter of any of Examples 19-35, and wherein the primary sensor and the secondary sensor form a portion of the sensor controller.

Example 37 includes one or more machine-readable storage media comprising a plurality of instructions stored thereon that, when executed, causes sensor controller of a predictive sensor module to perform the method of any of Examples 19-36.

Example 38 includes a predictive sensor module comprising means for producing primary sensor data indicative of a primary characteristic of the monitored system; means for producing secondary sensor data indicative of a secondary characteristic, different from the primary characteristic, of the monitored system; means for determining a measured value of the primary characteristic based on the primary sensor data; means for determining a measured value of the secondary characteristic based on the secondary sensor data; means for predicting a predicted value of the primary characteristic using a predictive model with the measured value of the secondary characteristic as an input to the predictive model; means for determining whether to update the predicted model based on a comparison of the measured value and the predicted value of the primary characteristic.

Example 39 includes the subject matter of Example 38, and wherein the predictive model is a recurrent neural network.

Example 40 includes the subject matter of any of Examples 38 and 39, and wherein the predictive model comprises a plurality of model parameters.

Example 41 includes the subject matter of any of Examples 38-40, and further including means for updating one or more of the plurality of model parameters in response to determining that the predicted model is to be updated.

Example 42 includes the subject matter of any of Examples 38-41, and wherein the means for determining whether to update the predicted model further comprises means for determining a difference between the measured value of primary characteristic and the predicted value of primary characteristic.

Example 43 includes the subject matter of any of Examples 38-42, and wherein the means for determining whether to update the predicted model further comprises means for determining whether the difference is within a first reference threshold.

Example 44 includes the subject matter of any of Examples 38-43, and wherein the first reference threshold indicates a predetermined ideal range.

Example 45 includes the subject matter of any of Examples 38-44, and further including means for transmitting, in response to a determination that the difference is within the first reference threshold, a heartbeat signal to the model management system that indicates a predictive model managed by the model management system does not need updated.

Example 46 includes the subject matter of any of Examples 38-45, and wherein the means for determining whether to update the predicted model further comprises means for determining whether the difference is within a second reference threshold in response to a determination that the difference is not within the first reference threshold.

Example 47 includes the subject matter of any of Examples 38-46, and wherein the second reference threshold indicates a predetermined acceptable range.

Example 48 includes the subject matter of any of Examples 38-47, and further including means for updating the predictive model in response to a determination that the difference is within the second reference threshold and not within first reference threshold.

Example 49 includes the subject matter of any of Examples 38-48, and wherein the means for updating the predictive model comprises means for updating a plurality of model parameters of the predictive model based on at least one of the measured value of primary characteristic, the measured value of secondary characteristic, or the difference.

Example 50 includes the subject matter of any of Examples 38-49, and further including means for performing, in response to a determination that the difference is not within the second reference threshold, a sensor operation analysis to determine whether the primary sensor is operating correctly.

Example 51 includes the subject matter of any of Examples 38-50, and wherein the means for performing the sensor operation analysis comprises means for transmitting the measured value of primary characteristic, the measured value of secondary characteristic, and a plurality of model parameters to a model management system, wherein the plurality of model parameters comprise a predictive model used to predict the predicted value of the primary characteristic based on the measured value of the secondary characteristic.

Example 52 includes the subject matter of any of Examples 38-51, and further including means for updating the predictive model in response to a determination that the difference is not within the second reference threshold.

Example 53 includes the subject matter of any of Examples 38-52, and wherein the means for updating the predictive model comprises means for updating a plurality of model parameters of the predictive model based on at least one of the measured value of primary characteristic, the measured value of secondary characteristic, or the difference.

Example 54 includes the subject matter of any of Examples 38-53, and further including means for producing secondary sensor data indicative of a different secondary characteristic, different from the primary characteristic and other secondary characteristics, of the monitored system; and further comprising means for determining a measured value of each secondary characteristic based on the corresponding secondary sensor data and means for predicting the predicted value of the primary characteristic using the predictive model with each of the measured values of the secondary characteristic as inputs to the predictive model.

Example 55 includes the subject matter of any of Examples 38-54, and wherein the primary sensor and the secondary sensor form a portion of the sensor controller.

The invention claimed is:

1. A predictive sensor module to monitor a characteristic of a monitored system, the predictive sensor module comprising:
a primary sensor to produce primary sensor data indicative of a primary characteristic of the monitored system;
one or more secondary sensors to produce secondary sensor data indicative of a secondary characteristic, different from the primary characteristic, of the monitored system; and
a sensor controller to (i) determine a measured value of the primary characteristic based on the primary sensor data, (ii) determine a measured value of the secondary characteristic based on the secondary sensor data, (iii) predict a predicted value of the primary characteristic using a predictive model with the measured value of the secondary characteristic as an input to the predictive model, and (iv) determine whether to update the predicted model based on whether a difference between the measured value and the predicted value of the primary characteristic exceeds a threshold.

2. The predictive sensor module of claim 1, wherein to determine whether to update the predicted model further comprises to determine whether the difference is within a first reference threshold.

3. The predictive sensor module of claim 2, wherein the sensor controller is further to transmit, in response to a determination that the difference is within the first reference threshold, a heartbeat signal to a model management system that indicates a predictive model managed by the model management system does not need updated.

4. The predictive sensor module of claim 2, wherein to determine whether to update the predicted model further comprises to determine whether the difference is within a second reference threshold in response to a determination that the difference is not within the first reference threshold.

5. The predictive sensor module of claim 4, wherein the sensor controller is further to update the predictive model in response to a determination that the difference is within the second reference threshold and not within first reference threshold, and
wherein to update the predictive model comprises to update a plurality of model parameters of the predictive model based on at least one of the measured value of primary characteristic, the measured value of secondary characteristic, or the difference.

6. The predictive sensor module of claim 4, wherein the sensor controller is further to perform, in response to a determination that the difference is not within the second reference threshold, a sensor operation analysis to determine whether the primary sensor is operating correctly.

7. The predictive sensor module of claim 6, wherein to perform the sensor operation analysis comprises to transmit the measured value of the primary characteristic, the measured value of secondary characteristic, and a plurality of model parameters to a model management system, wherein the plurality of model parameters comprise the predictive model used to predict the predicted value of the primary characteristic based on the measured value of the secondary characteristic.

8. The predictive sensor module of claim 6, wherein the sensor controller is further to update the predictive model in response to a determination that the difference is not within the second reference threshold, and
wherein to update the predictive model comprises to update a plurality of model parameters of the predictive model based on at least one of the measured value of primary characteristic, the measured value of secondary characteristic, or the difference.

9. A method for monitoring a characteristic of a monitored system, the method comprising:
producing, by a primary sensor, primary sensor data indicative of a primary characteristic of the monitored system;
producing, by a secondary sensor, secondary sensor data indicative of a secondary characteristic, different from the primary characteristic, of the monitored system;
determining, by a sensor controller, a measured value of the primary characteristic based on the primary sensor data;
determining, by the sensor controller, a measured value of the secondary characteristic based on the secondary sensor data;
predicting, by the sensor controller, a predicted value of the primary characteristic using a predictive model with the measured value of the secondary characteristic as an input to the predictive model;
determining, by the sensor controller, whether to update the predicted model based on whether a difference between the measured value and the predicted value of the primary characteristic exceeds a threshold.

10. The method of claim 9, wherein determining whether to update the predicted model further comprises determining whether the difference is within a first reference threshold.

11. The method of claim 10, further comprising transmitting, by the sensor controller, in response to a determination that the difference is within the first reference threshold, a heartbeat signal to the model management system that indicates a predictive model managed by the model management system does not need updated.

12. The method of claim 10, wherein determining whether to update the predicted model further comprises determining whether the difference is within a second reference threshold in response to a determination that the difference is not within the first reference threshold.

13. The method of claim 12, further comprising updating, by the sensor controller, the predictive model in response to a determination that the difference is within the second reference threshold and not within first reference threshold,
wherein updating the predictive model comprises updating a plurality of model parameters of the predictive model based on at least one of the measured value of primary characteristic, the measured value of secondary characteristic, or the difference.

14. The method of claim 12, further comprising transmitting, in response to a determination that the difference is not within the second reference threshold, the measured value of primary characteristic, the measured value of secondary characteristic, and a plurality of model parameters to a model management system, wherein the plurality of model parameters comprise a predictive model used to predict the predicted value of the primary characteristic based on the measured value of the secondary characteristic.

15. The method of claim 12, further comprising updating, by the sensor controller, the predictive model in response to a determination that the difference is not within the second reference threshold, and
wherein updating the predictive model comprises updating a plurality of model parameters of the predictive model based on at least one of the measured value of primary characteristic, the measured value of secondary characteristic, or the difference.

16. One or more machine-readable storage media comprising a plurality of instructions stored thereon that, when executed, causes sensor controller of a predictive sensor module to:
acquire, from a primary sensor, primary sensor data indicative of a primary characteristic of the monitored system;
acquire, from a secondary sensor, secondary sensor data indicative of a secondary characteristic, different from the primary characteristic, of the monitored system;
determine a measured value of the primary characteristic based on the primary sensor data;
determine a measured value of the secondary characteristic based on the secondary sensor data;
predict a predicted value of the primary characteristic using a predictive model with the measured value of the secondary characteristic as an input to the predictive model;
determine whether to update the predicted model based on whether a difference between the measured value and the predicted value of the primary characteristic exceeds a threshold.

17. The one or more machine-readable storage media of claim 16, wherein to determine whether to update the predicted model further comprises to determine whether the difference is within a first reference threshold.

18. The one or more machine-readable storage media of claim 17, wherein the plurality of instructions, when executed, further cause the sensor controller to transmit, in response to a determination that the difference is within the first reference threshold, a heartbeat signal to the model management system that indicates a predictive model managed by the model management system does not need updated.

19. The one or more machine-readable storage media of claim 17, wherein to determine whether to update the predicted model further comprises to determine whether the difference is within a second reference threshold in response to a determination that the difference is not within the first reference threshold.

20. The one or more machine-readable storage media of claim 19, wherein the plurality of instructions, when executed, further cause the sensor controller to update the predictive model in response to a determination that the difference is within the second reference threshold and not within first reference threshold,
wherein to update the predictive model comprises to update a plurality of model parameters of the predictive model based on at least one of the measured value of primary characteristic, the measured value of secondary characteristic, or the difference.

21. The one or more machine-readable storage media of claim 19, wherein the plurality of instructions, when executed, further cause the sensor controller to transmit, in response to a determination that the difference is not within the second reference threshold, the measured value of primary characteristic, the measured value of secondary characteristic, and a plurality of model parameters to a model management system, wherein the plurality of model parameters comprise a predictive model used to predict the predicted value of the primary characteristic based on the measured value of the secondary characteristic.

22. The one or more machine-readable storage media of claim 19, wherein the plurality of instructions, when executed, further cause the sensor controller to update the predictive model in response to a determination that the difference is not within the second reference threshold, and wherein to update the predictive model comprises to update a plurality of model parameters of the predictive model based on at least one of the measured value of primary characteristic, the measured value of secondary characteristic, or the difference.

\* \* \* \* \*